(12) United States Patent
Chitikena et al.

(10) Patent No.: US 9,483,450 B2
(45) Date of Patent: Nov. 1, 2016

(54) METHOD AND APPARATUS FOR EXTRACTING LOCALIZABLE CONTENT FROM AN ARTICLE

(71) Applicant: Adobe Systems Incorporated, San Jose, CA (US)

(72) Inventors: Satish Kumar Chitikena, Vizianagaram (IN); Anubhav Jain, Faridabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 418 days.

(21) Appl. No.: 13/856,860

(22) Filed: Apr. 4, 2013

(65) Prior Publication Data

US 2014/0304585 A1  Oct. 9, 2014

(51) Int. Cl.
*G06F 17/00* (2006.01)
*G06F 17/22* (2006.01)
*G06F 17/28* (2006.01)

(52) U.S. Cl.
CPC ....... *G06F 17/2247* (2013.01); *G06F 17/2229* (2013.01); *G06F 17/28* (2013.01)

(58) Field of Classification Search
CPC ............................ G06F 17/2247; G06F 17/28
USPC .................................. 715/234, 249, 264, 265
See application file for complete search history.

(56) References Cited

U.S. PATENT DOCUMENTS

| | | | | |
|---|---|---|---|---|
| 7,747,588 | B2* | 6/2010 | Thompson | G06F 17/2247 707/694 |
| 8,195,766 | B2* | 6/2012 | Lin | H04L 67/02 709/219 |
| 9,081,769 | B2* | 7/2015 | Liu | G06F 17/2288 |
| 9,195,653 | B2* | 11/2015 | Yin | G06F 17/289 |
| 2003/0135501 | A1* | 7/2003 | Frerebeau | G06F 9/4448 |
| 2007/0050757 | A1* | 3/2007 | van Woerkom et al. | 717/117 |
| 2007/0198479 | A1* | 8/2007 | Cai et al. | 707/3 |
| 2007/0255552 | A1* | 11/2007 | Thiesson et al. | 704/8 |
| 2009/0326911 | A1* | 12/2009 | Menezes et al. | 704/2 |

* cited by examiner

*Primary Examiner* — Stephen Hong
*Assistant Examiner* — Matthew Ludwig
(74) *Attorney, Agent, or Firm* — Keller Jolley Preece

(57) ABSTRACT

A computer implemented method and apparatus for extracting localizable content from an article. The method comprises accessing a page content tree comprising a plurality of nodes; generating a set of all properties for each node in the plurality of nodes of the page content tree; accessing a localization tree comprising a global set of localizable properties of nodes; generating a set of localizable properties from the localization tree for nodes that match nodes of the page content tree; performing an intersection of the set of all properties for each node of the page content tree and the set of localizable properties; and extracting a value for each property in the intersection.

20 Claims, 4 Drawing Sheets

METHOD AND APPARATUS FOR EXTRACTING LOCALIZABLE CONTENT FROM AN ARTICLE

BACKGROUND OF THE INVENTION

1. Field of the Invention

Embodiments of the present invention generally relate to content translation and, more particularly, to a method and apparatus for extracting localizable content from an article.

2. Description of the Related Art

In today's global marketplace, digital content that is written in, for example, English, must be translated and localized in order to make it accessible to readers of other cultures and in other languages. Translation is a literal word for word changing of source content into a target language. Localization adapts source content for a specific region or language by adding locale-specific content and translating text as needed. Localization does not require word for word matching of the source content, but rather provides content that has the same connotation, or meaning, as the source content. For example, "Like father, like son" is an English phrase. This phrase localized for the Chinese culture may read, after word for word translation from Chinese back into English, "Tigers do not breed dogs." In some cases, however, localization may include a word for word translation.

Digital content is typically created in a content management system, such as ADOBE® CQ, which is based on a Java Content Repository (JCR) standard. Content authored using the JCR standard has a specific format, although when a reader views the content, it is typically in the form of a HyperText Markup Language (HTML) page. The content is referred to as an article or page, for example, a dynamic Portable Document Format (PDF). The page has components that make up the content of the page, for example, "bodycontent", "legaltext", and the like. Each component is stored as a node in the JCR. Each node has properties that are also stored in the JCR. The properties include information about the component, such as "datelastmodified", "lastmodifiedby", "description", "title", and the like. Not all properties are applicable for localization. For example, the "datelastmodified" and "lastmodifiedby" properties may not need to be localized, but the description and title may be properties that an author wants to have translated or localized when displaying the page in another locale. Currently, when digital content is created using the JCR standard, the entire HTML file is sent to translators for localization. Sending the entire HTML files leads to a waste of time because the localizable properties must be identified manually.

Therefore, there is a need for a method and apparatus for extracting localizable content from an article.

SUMMARY OF THE INVENTION

A method and apparatus for extracting localizable content from an article substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
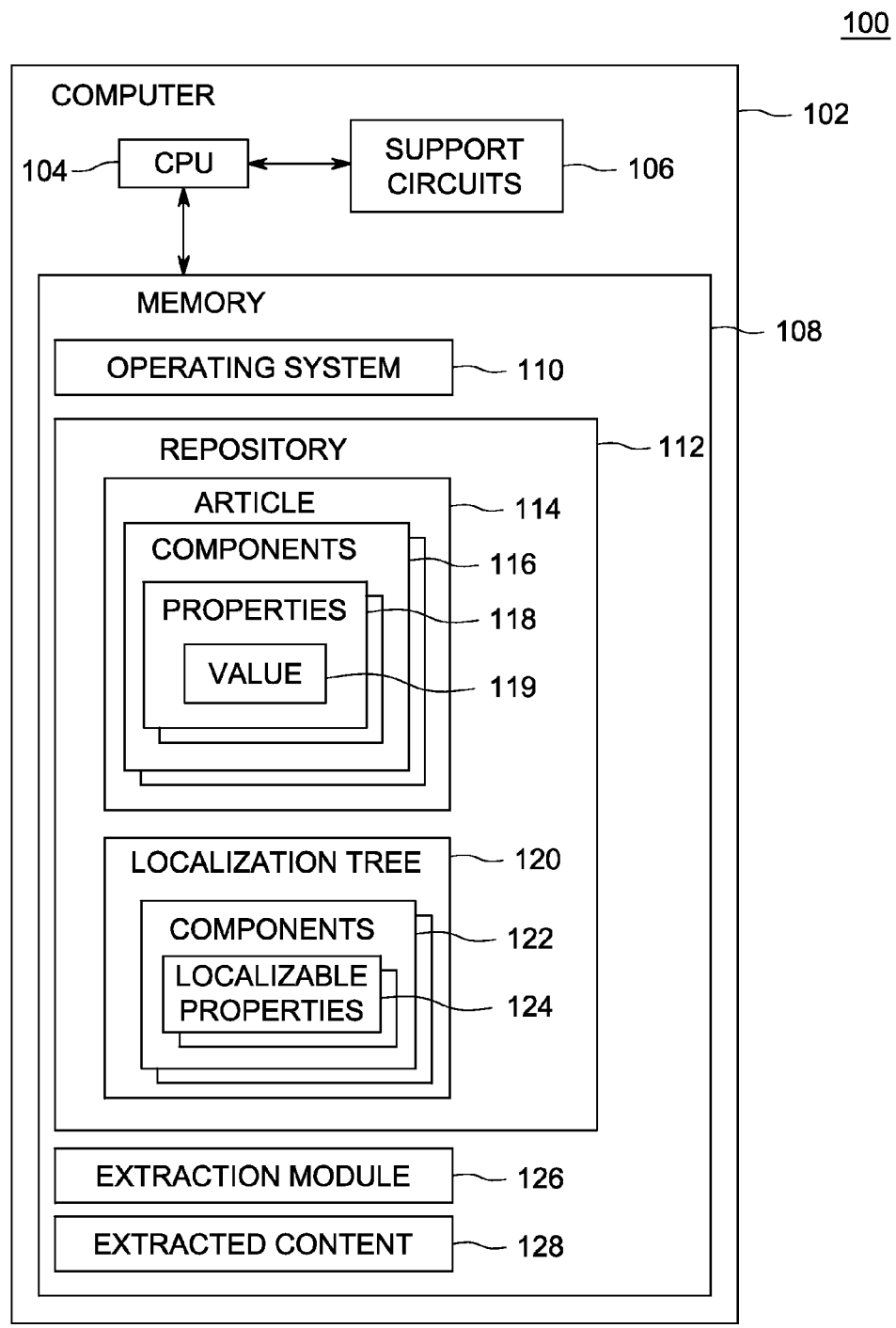
FIG. 1 is a block diagram of an apparatus for extracting localizable content from an article, according to one or more embodiments.

While the method and apparatus is described herein by way of example for several embodiments and illustrative drawings, those skilled in the art will recognize that the method and apparatus for extracting localizable content from an article is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for extracting localizable content from an article defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. The words "localize", "localizable", and "localization" used herein refer to both localization and/or translation. The word "translation", as used herein alone or in combination with localization, also includes a change in dialect for a given native language.

DETAILED DESCRIPTION OF EMBODIMENTS

Embodiments of the present invention include a method and apparatus for extracting localizable content from an article. A global set of localizable properties of nodes is stored in a localization tree. The components of an article are saved as hierarchical nodes in a page content tree in the Java Content Repository (JCR). The method traverses the page content tree for the article. For each node in the page content tree, the method generates a set of the properties that are defined for the node. The method then accesses the localization tree and looks for the component node from the page content tree in the localization tree and, if the component node is found, generates a set of localizable properties for the component node. An intersection is performed on the two sets, which results in a set of localizable properties for the node of the article. The method extracts the value for each localizable property and stores it to be sent out for localization. After this process is performed on each node in the page content tree, all of the localizable properties are extracted and packaged for localization by any globalization management system.

Advantageously, the present invention provides an easy and flexible way for content authors to have their content localized, by having the localizable properties automatically identified and formatted for localization. By this invention, there is no need to send an entire HTML file to a Globalization Management System to manually determine what content is to be localized Various embodiments of a method and apparatus for extracting localizable content from an article are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for extracting localizable content from an article, according to one or more embodiments. The apparatus 100 includes a computer 102. The computer 102 is a type of computing device (e.g., a desktop computer, laptop, tablet computer, smart phone, and the like). The computer 102 may be a device used for web content management. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 106 includes at least one of Read Only Memory (ROM), Random Access Memory (RAM), disk drive storage, optical storage, removable storage and/or the like.

The memory 108 includes an operating system 110, a repository 112, an extraction module 126, and extracted content 128. The repository 112 includes an article 114 and a localization tree 120. The article 114 may be any type of content, such a web page or document that has text that may be localized for different locales. The article 114 includes components 116 and the components 116 include properties 118. Each property 118 includes a value 119. The memory 108 also includes a localization tree 120 having one or more components 122 that include localizable properties 124. The operating system 110 may include various commercially known operating systems.

The localization tree 120 is a global set of localizable properties. The components 122 of the localization tree 120 include a plurality of properties, however, not all properties are localizable. Only those properties that are localizable are stored as localizable properties 124. The localization tree 120 may be modified by a developer to add or delete localizable properties 124.

When an article 114 is stored in the repository 112, it is stored as components 116 (represented as nodes). All properties 118 of a component 116 are stored with the component 116. In order to perform localization, the extraction module 126 generates a set for a component 116. The set includes all of the properties 118 of the component 116. The set also includes the value 119 of the property 118.

The extraction module 126 then looks up the component 116 in the localization tree 120. The component 116 will only be found in the localization tree 120 if there are properties 118 of component 116 that are localizable. If the component 116 matches the component 122 in the localization tree 120, the extraction module 126 generates a set that includes all of the localizable properties 124 for the component 122. The extraction module 126 performs an intersection on the two sets and generates a new set based on the intersection. The new set includes only the properties 118 of the component 116 that are localizable and the value 119 of the property 118. The extraction module 126 then extracts the value 119 for each component 116 from the intersection and stores the value 119 as extracted content 128. The extraction module 126 repeats this process for each component 116 of the article 114. Once completed, the extracted content 128 may be sent to a globalization management system, which is a type of software system that provides localization services. The globalization management system may be a third-party service provider or may be an internal software system.

Figure 2:
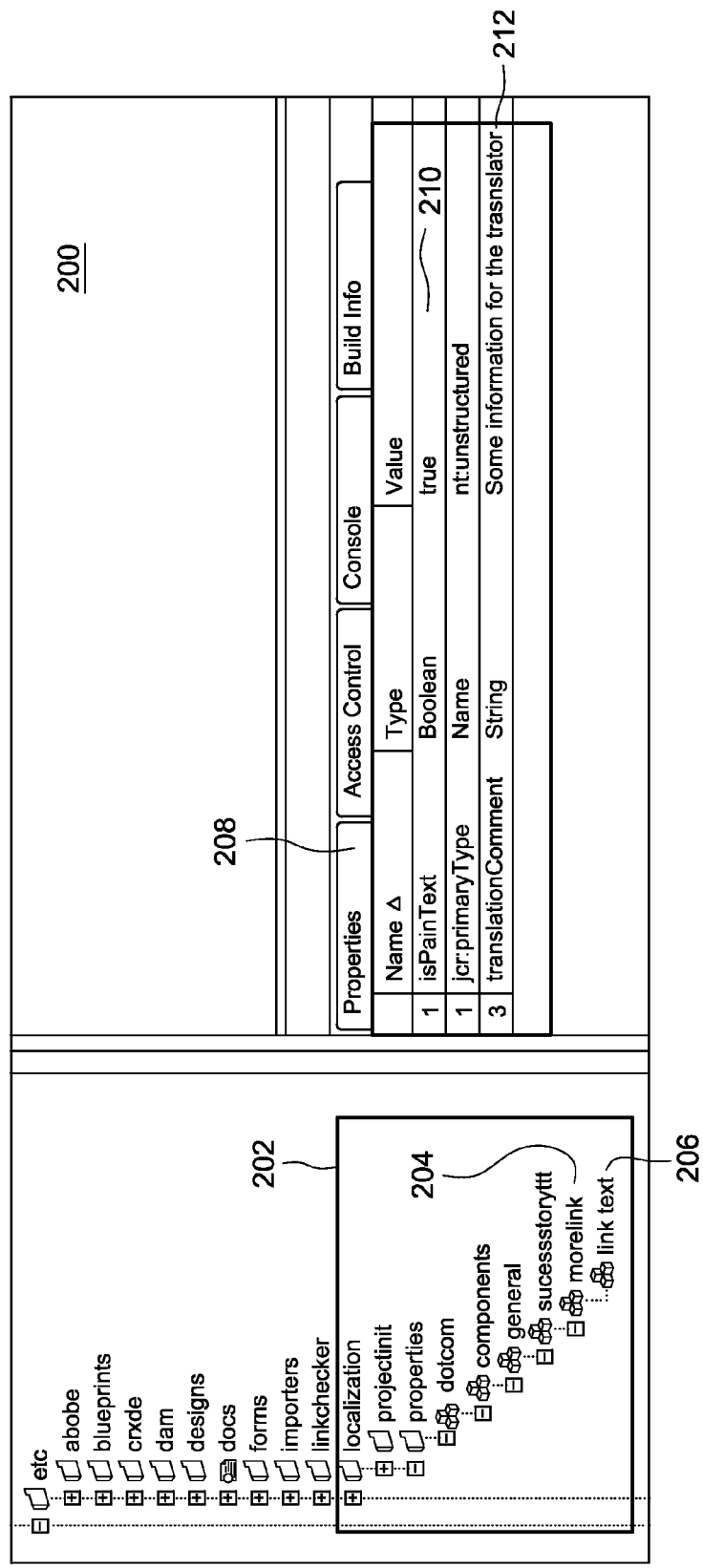
FIG. 2 depicts an illustration of the localization tree of FIG. 1, according to one or more embodiments.

FIG. 2 depicts an illustration 200 of a localization tree 202 corresponding to the localization tree 120 of FIG. 1, according to one or more embodiments. The localization tree 202 includes components that have properties that are localizable. For example, the component "morelink", represented by node 204, includes a property "linkText", represented by node 206. The property "linkText" includes its own properties (or metadata) 208. These properties 208 provide information that is helpful for localization. For example, property 210, namely "isPlainText" with a value of true may be treated differently than a property where "isPlainText" has a value of false, meaning the property includes rich text. In addition, the property 212, namely "translationComment" may include special instructions for the translator who performs the localization.

The localization tree 202 may be defined using tan XML schema as follows:

```
<componentGroup>
    <component name="[ComponentName]"
    isRequiredForLoc="[true/false]" path="path of the component">
        <componentProperty name="[Name of translatable/localizable property]"
        isTranslatable="[true/false]" isLocalizable="[true/false]">
            <property>
```

```
            <name>isPlainText</name>
            <value>[True/False]</value>
        </property>
        <property>
            <name>translationComment</name>
            <value>"Translation Comments for vendor"</value>
        </property>
        </componentProperty>
    </component>
</componentGroup>
```

Specifically, for localization tree 202, the component moreLink may be defined as follows:

```
<componentGroup>
    <component name="[moreLink]" isRequiredForLoc="[true]"
    path="/content/dotcom/en_xx/products/acrobatpro/
    successStory">
        <componentProperty name="[linkText]"
        isTranslatable="[true]" isLocalizable="[false]">
        <property>
            <name>isPlainText</name>
            <value>[True]</value>
        </property>
        <property>
            <name>translationComment</name>
            <value>"Translation Comments for vendor"</value>
        </property>
        </componentProperty>
    </component>
</componentGroup>
```

Additional properties may be defined using the localization tree using the above schema. For example a property name isPatternMatch may be a property with a value of True/False. It is appreciated that other embodiments of the present disclosure envision additional properties in the localization tree.

Figure 3:
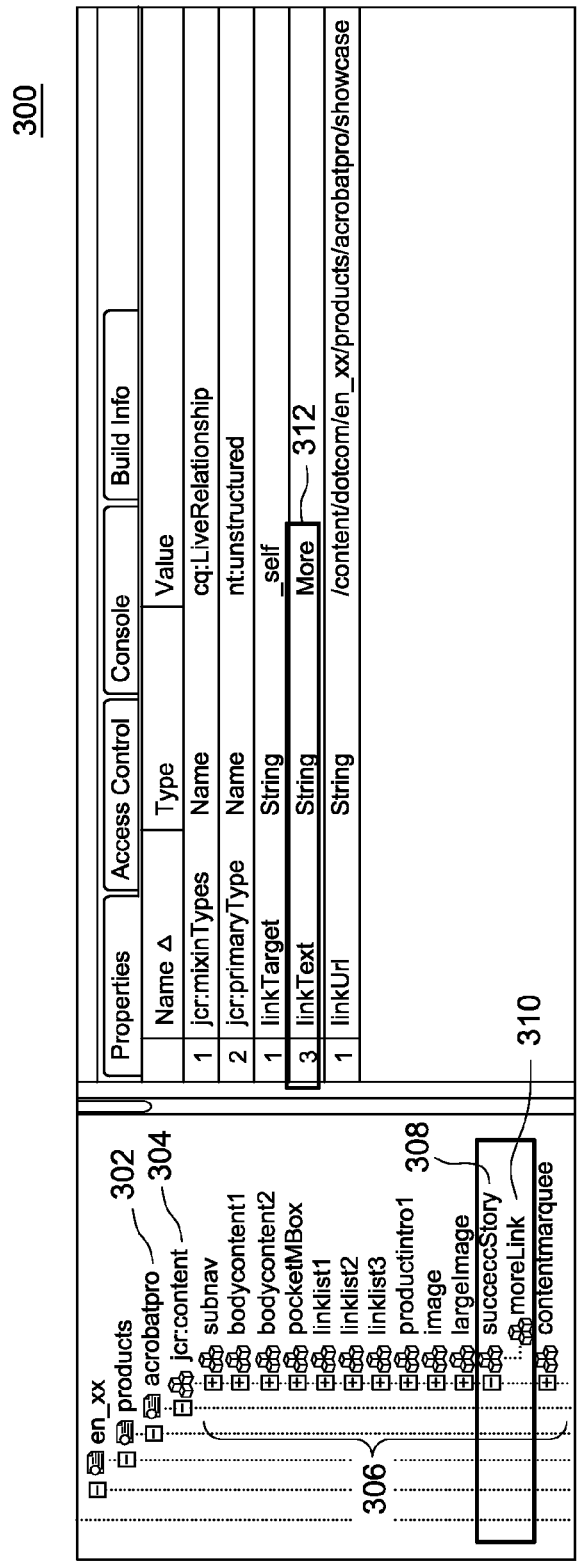
FIG. 3 illustrates a page content tree of an article as stored in the repository of FIG. 1.

FIG. 3 illustrates a page content tree 300 of an article 114 as stored in the repository 112 of FIG. 1. The article "acrobatpro" is represented as a node 302. One component of the article is "jcr:content", represented as node 304. The "jcr:content" component includes a plurality of components represented as nodes 306, one of which is "successStory", represented by node 308. The component "successStory" includes component "moreLink" represented by node 310. A property 312 of "moreLink" is "linkText" that has a value of "More". The connection between the page content tree 300 and the localization tree 202 is explained in further detail with respect to FIG. 4 below.

Figure 4:
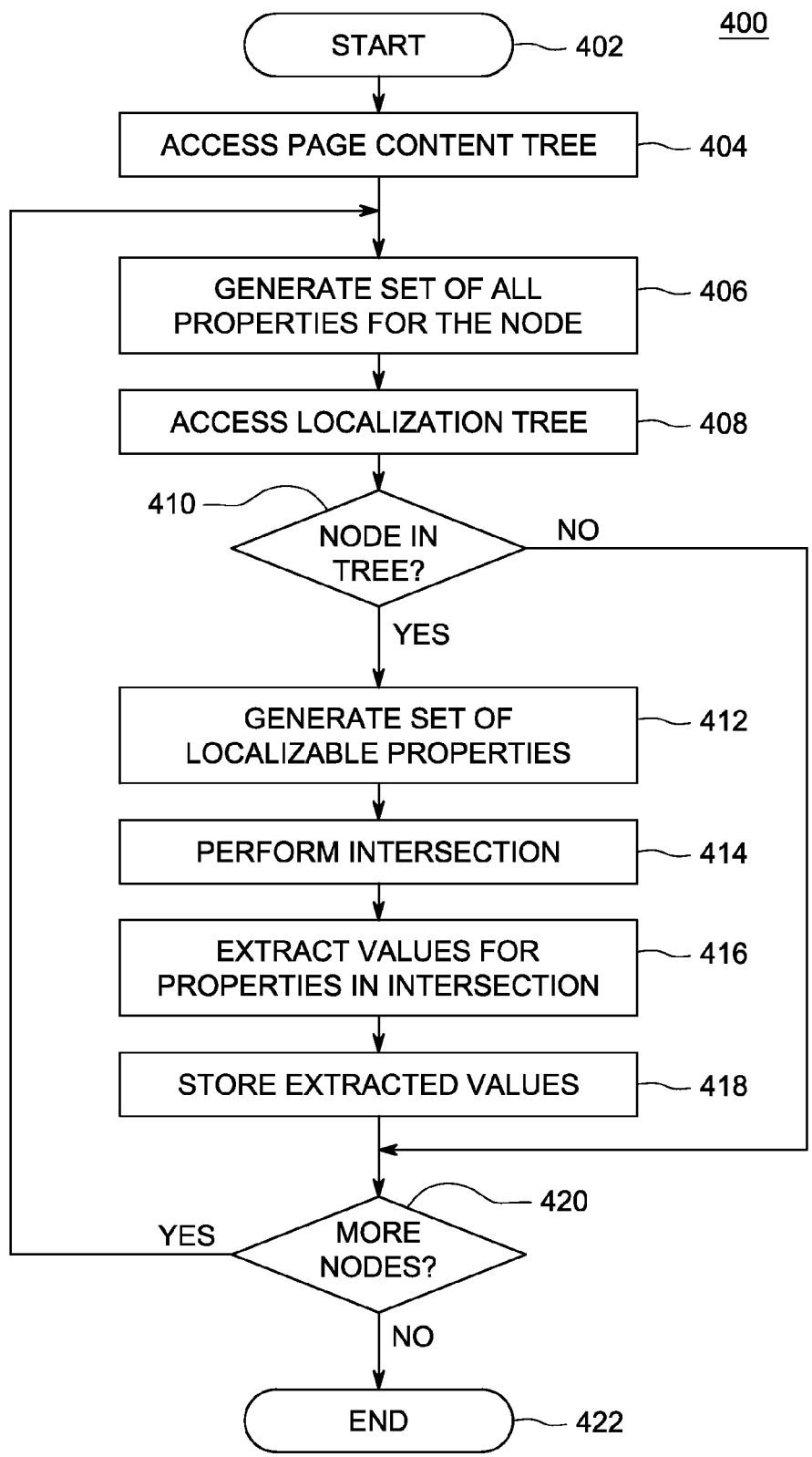
FIG. 4 depicts a flow diagram of a method for extracting localizable properties from an article, as performed by the extraction module of FIG. 1, according to one or more embodiments of the invention.

FIG. 4 depicts a flow diagram of a method 400 for extracting localizable properties from an article, as performed by the extraction module 126 of FIG. 1, according to one or more embodiments of the invention. The method 400 determines which properties of the components of the article are localizable, extracts their values, and stores the values such that they may be sent to a globalization management system for localization.

The method 400 starts at step 402 and proceeds to step 404. At step 404, the method 400 accesses a page content tree of an article. The article may, for example, be a web page. The web page may include text, images, hyperlinks, and the like. The text on the page may be content that a developer want displays in different languages depending on the locale where the web page is viewed. There may be components, such as "bodytext", "legaltext", and the like. The components of the article are represented in a page content tree. The page content tree includes a plurality of nodes. Each node represents a component of the article. Each node includes a plurality of properties, some of which are localizable and some which are not. For example, properties may include a timestamp of when the property was last modified, a userID of who was the last person to modify the property, a description, a title, and the like. One or more of these properties may be localizable, for example, the description and the title are typically properties that would be localized.

The method 400 proceeds to step 406, where the method 400 generates a set of all properties for the node. For each property in the set, the method 400 also stores the value of the property. For example, the method 400 may generate a set for a component with five properties as follows:

{property1=value1,property2=value2,
property3=value3,property4=value4,
property5=value5}

The method 400 proceeds to step 408, where the method 400 accesses a localization tree to find a match in the localization tree for the current node in the page content tree. The method 400 proceeds to step 410, where the method 400 determines whether a match was found for the current node in the localization tree. If the node was not found, then there are no localizable properties for the node and the method 400 proceeds to step 422.

However, if at step 410, the method 400 determines that the current node in the page content tree is found in the localization tree, the method 400 proceeds to step 412, where the method 400 generates a set of all localizable properties. For example, if property 2 and property 4 of the component are localizable, the method 400 may generate a set for the localizable properties as follows:

{property2,property4}

The method 400 proceeds to step 414, where the method 400 performs an intersection on the two sets. The method 400 generates a set including the localizable properties from the page content tree, including the value of the property. In the present example, the intersection results in a set as follows:

{property2=value2,property4=value4}

The method 400 proceeds to step 416, where the method 400 extracts the values from the set resulting from the intersection. The values in the present example are value2 and value4.

The method 400 proceeds to step 418, where the method 400 stores the extracted values. The method 400 stores the extracted values according to an interexchange schema required by a globalization management system. The interexchange schema may be Extensible Markup Language (XML) Localization Interchange File Format (XLIFF). The interexchange schema is determined based on a selected globalization management system.

The method 400 proceeds to step 420, where the method 400 determines whether there are any more nodes in the page content tree that may have localization properties that need to be extracted. If the method 400 determines there are more nodes, the method 400 proceeds to step 406 and iterates until all nodes have been evaluated at which time the method 400 proceeds to step 422 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can include, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for identifying and extracting localizable content from an article comprising:
  accessing a page content tree of an article, the page content tree comprising a plurality of nodes representing component parts of the article;
  identifying a set of properties for each node in the plurality of nodes of the page content tree, the properties including information about the component parts;
  accessing a localization tree comprising a global set of localizable properties of nodes;
  identifying localizable properties from the localization tree for nodes of the localization tree that match nodes of the page content tree;
  generating, by at least one processor, a set of localizable properties consisting of properties of the nodes of the page content tree that are localizable by performing an intersection of the set of properties for each node of the page content tree and the identified localizable properties; and
  extracting, from the nodes of the page content tree that intersect with the nodes of the localization tree, a value for each property in the set of localizable properties generated by the intersection.

2. The method of claim 1, further comprising:
  converting the extracted values into a format compatible with a globalization management system;
  sending the converted extracted values to the global management system for localization and translation;
  receiving localized content from the global management system;
  importing the localized content; and
  publishing the localized content.

3. The method of claim 1, wherein the article is stored in a java content repository format.

4. The method of claim 1, wherein generating the set of localizable properties comprises:
  identifying a node in the localization tree that matches a node in the page content tree; and
  identifying one or more properties in the identified node in the localization tree that represents a localizable property.

5. The method of claim 4, wherein the intersection identifies one or more localizable properties for the node in the page content tree.

6. The method of claim 1, wherein the localization tree is generated using an interexchange schema.

7. The method of claim 1, wherein the localization tree comprises metadata for a localizable property and wherein the metadata defines whether a property is localizable or translatable, whether the property is plain text, and includes translation instructions for the globalization management system.

8. A system for extracting localizable content from an article comprising:
at least one processor; and
at least one non-transitory computer readable storage medium storing instructions, that when executed by the at least one processor, cause the system to:
access a page content tree of an article, the page content tree comprising a plurality of nodes representing component parts of the article;
identify a set of properties for each node in the plurality of nodes of the page content tree, the properties including information about the component parts;
access a localization tree comprising a global set of localizable properties of nodes;
identify localizable properties from the localization tree for nodes of the localization tree that match nodes of the page content tree;
generate a set of localizable properties consisting of properties of the nodes of the page content tree that are localizable by performing an intersection of the set of properties for each node of the page content tree and identified localizable properties; and
extract, from the nodes of the page content tree that intersect with the nodes of the localization tree, a value for each property in the set of localizable properties generated by the intersection.

9. The system of claim 8, wherein the localization tree is generated using an interexchange schema.

10. The system of claim 9, wherein generating the set of localizable properties comprises:
identifying a node in the localization tree that matches a node in the page content tree; and
identifying one or more properties in the identified node in the localization tree that represents a localizable property.

11. The system of claim 10, wherein the intersection identifies one or more localizable properties for the node in the page content tree.

12. The system of claim 8, further comprising instructions that, when executed by the at least one processor, cause the system to:
convert the extracted values into a format compatible with a globalization management system;
send the converted extracted values to the global management system for localization and translation;
receive localized content from the global management system;
import the localized content; and
publish the localized content.

13. The system of claim 8, wherein the localization tree comprises metadata for a localizable property, wherein the metadata defines whether a property is localizable or translatable, whether the property is plain text, and includes translation instructions for the globalization management system.

14. A non-transitory computer readable medium for storing computer instructions that, when executed by at least one processor causes the at least one processor to perform a method for extracting localizable and translatable content from an article comprising:
accessing a page content tree of an article, the page content tree comprising a plurality of nodes representing component parts of the article;
identifying a set of properties for each node in the plurality of nodes of the page content tree, the properties including information about the components parts;
accessing a localization tree comprising a global set of localizable properties of nodes;
identifying localizable properties from the localization tree for nodes of the localization tree that match nodes of the page content tree;
generating a set of localizable properties consisting of properties of the nodes of the page content tree that are localizable by performing an intersection of the set of properties for each node of the page content tree and the identified localizable properties; and
extracting, from the nodes of the page content tree that intersect with the nodes of the localization tree, a value for each property in the set of localizable properties generated by the intersection.

15. The non-transitory computer readable medium of claim 14, further comprising instructions that, when executed by the at least one processor, cause the computer system to perform the steps comprising:
converting the extracted values into a format compatible with a globalization management system;
sending the converted extracted values to the global management system for localization and translation;
receiving localized content from the global management system;
importing the localized content; and
publishing the localized content.

16. The non-transitory computer readable medium of claim 14, wherein the article is stored in a java content repository format.

17. The non-transitory computer readable medium of claim 14, wherein generating the set of localizable properties comprises:
identifying a node in the localization tree that matches a node in the page content tree; and
identifying one or more properties in the identified node in the localization tree that represents a localizable property.

18. The non-transitory computer readable medium of claim 17, wherein the intersection identifies one or more localizable properties for the node in the page content tree.

19. The non-transitory computer readable medium of claim 14, wherein the localization tree is generated using an interexchange schema.

20. The non-transitory computer readable medium of claim 14, wherein the localization tree comprises metadata for a localizable property, and wherein the metadata defines whether a property is localizable or translatable, whether the property is plain text, and includes translation instructions for the globalization management system.

* * * * *